Jan. 8, 1929.  L. L. HOFFMAN  1,698,546
PISTON RING
Filed Jan. 30, 1926
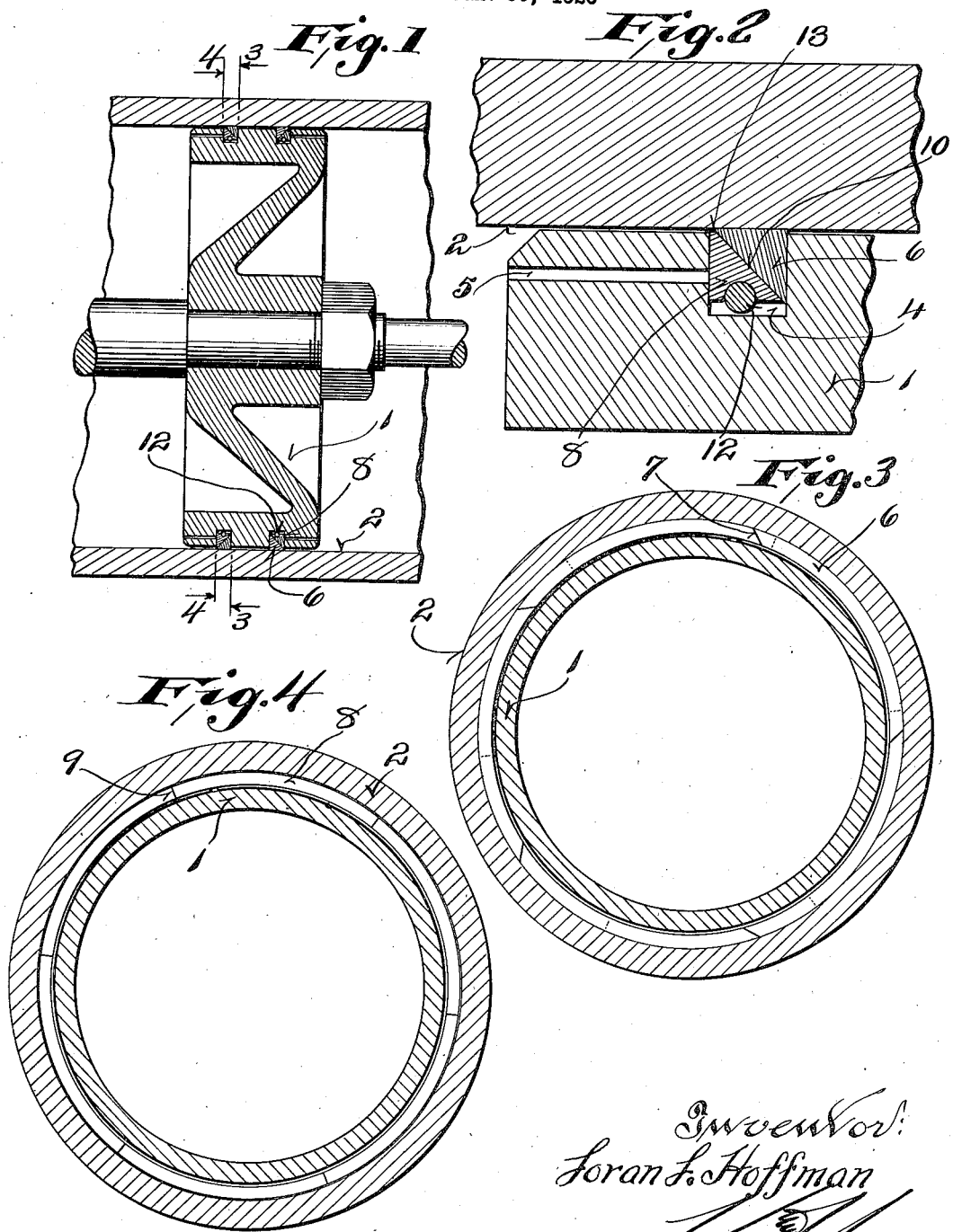
Inventor:
Loran L. Hoffman Patented Jan. 8, 1929.

1,698,546

UNITED STATES PATENT OFFICE.

LORAN LEE HOFFMAN, OF MILWAUKEE, WISCONSIN.

PISTON RING.

Application filed January 30, 1926. Serial No. 85,065.

This invention relates to piston rings and to the piston associated therewith.

Objects of this invention are to provide a piston ring which is of a composite construction and so organized that it will maintain a tight joint at all times with the cylinder, to provide means for urging the composite ring outwardly into contact with the cylinder walls, and to so organize the piston that even in the event of failure of certain parts of the composite ring that the action of the compressed gases will be such as to hold the ring in contact with the cylinder.

An embodiment of the invention is shown in the accompanying drawings, in which:—

Figure 1 is a sectional view showing the piston and the rings and a portion of the cylinder.

Figure 2 is an enlarged fragmentary detail of a portion of the piston.

Figure 3 is a sectional view on the line 3—3 of Figure 1 showing the outer piston ring.

Figure 4 is a sectional view on the line 4—4 of Figure 1 showing the inner piston ring.

The piston 1 is turned to a slightly smaller diameter than the internal diameter of the cylinder 2 in accordance with the usual practice. It is provided with a plurality of annular rectangular grooves 4 within which the composite rings fit. A series of small ducts 5 lead from the rectangular channels 4 to the outer face of the piston, as clearly shown in Figures 1 and 2.

The composite ring comprises an outer ring composed of a plurality of accurately turned members 6. These members are provided with contacting beveled surfaces 7, as shown in Figure 3. The inner portion of the ring comprises a plurality of members 8 which contact with each other along radial faces 9, as may be seen from Figure 4.

It is to be noted from a comparison of Figures 3 and 4 that the inner and outer portions of the rings are formed of a different number of segments. For instance five segments are shown in Figure 3 for the outer ring, and six segments in Figure 4 for the inner ring.

Further than this the faces 7 and 9 of the contacting portions of the outer and inner rings are cut along different lines so that leaking is minimized. The adjacent faces of the outer and inner rings are beveled, as shown at 10 in Figure 2, and they, together with the outer and inner portions, form in effect a wedge structure. The inner portion 8 of the ring is provided with an annular groove upon its inner side within which is seated a split circular spring 12 (see Figure 2). This spring tends to open outwardly and thus forces the inner portion 8 against the outer portion 6 pressing such outer portion against the cylinder and also wedging the portions 6 and 8 against the lateral sides of the rectangular slot 4 thus maintaining a gas tight joint. It is to be noted from Figure 2 that the upper edge of the member 6 is cut off as indicated at 13. This prevents the cutting of this edge into the cylinder with the consequent marring of such cylinder.

If for any reason the spring 12 should break, pressure is communicated to the members 8 and 6 through the duct 5 and consequently such members are forced outwardly into contact with the cylinder. These rings are primarily intended for relatively large cylinders such as the large cylinders employed in steam engines, but, obviously, the rings may be used for internal combustion and other types of engines. In the case of small cylinders, it may be found sufficient to provide a single split in the inner and outer members in place of forming such members of a multitude of parts.

It will thus be seen that a composite piston ring has been provided which is so constructed that it will at all times maintain a yielding firm joint with the cylinder and will also maintain a firm joint with the lateral walls of the rectangular grooves.

Although one form of the invention has been described in considerable detail, it is to be understood that the invention may be variously embodied and is, therefore, to be limited only as claimed.

I claim:

1. The combination of a piston and a cylinder, such piston having a rectangular peripheral groove and ducts leading thereinto, a composite piston ring comprising an outer member composed of a plurality of parts, an inner member composed of a different number of parts, said inner and outer members having contacting beveled surfaces, and resilient means positioned interiorly of said inner member for causing the ring to expand and force the inner and outer members into contact with the lateral faces of said groove.

2. The combination of a piston and a cylinder, said piston having a pair of grooves in its peripheral portion, said piston having a duct leading from each groove through the adjacent face of the piston, a pair of piston rings located in each groove and having bevelled contacting surfaces, said rings contacting directly with the side walls of the grooves, one of said rings of each pair constituting a packing ring and the other of said rings of each pair constituting an adjusting ring, said adjusting ring having an outer cut-away corner out of contact with the cylinder wall and having an internal cylindrical surface provided with a groove, and an annular spring seated in said last mentioned groove, the rings of each set being formed of a plurality of portions with contacting faces for one ring arranged at a different angle to a radial line from the contacting faces for the other ring, whereby registering of the splits in the individual rings of a pair cannot occur.

In testimony that I claim the foregoing I have hereunto set my hand at Milwaukee, in the county of Milwaukee and State of Wisconsin.

LORAN LEE HOFFMAN.